(12) United States Patent
Jain

(10) Patent No.: US 10,535,985 B2
(45) Date of Patent: Jan. 14, 2020

(54) WALL MOUNTED RAIL SYSTEM

(71) Applicant: Sanjeev Jain, Fremont, CA (US)

(72) Inventor: Sanjeev Jain, Fremont, CA (US)

( * ) Notice: Subject to any disclaimer, the term of this patent is extended or adjusted under 35 U.S.C. 154(b) by 0 days.

(21) Appl. No.: 16/167,841

(22) Filed: Oct. 23, 2018

(65) Prior Publication Data
US 2019/0237952 A1  Aug. 1, 2019

Related U.S. Application Data

(60) Provisional application No. 62/624,904, filed on Feb. 1, 2018.

(51) Int. Cl.
*H02G 3/12* (2006.01)
*E04F 19/02* (2006.01)
*E04F 19/04* (2006.01)
*F24F 13/06* (2006.01)
*H02G 3/10* (2006.01)
*F24F 13/02* (2006.01)

(52) U.S. Cl.
CPC .......... *H02G 3/128* (2013.01); *E04F 19/026* (2013.01); *E04F 19/0459* (2013.01); *F24F 13/0227* (2013.01); *F24F 13/06* (2013.01); *H02G 3/10* (2013.01); *E04F 2019/044* (2013.01)

(58) Field of Classification Search
CPC ...... H02G 3/128; H02G 3/105; H02G 3/0418; H02G 3/0431; H02G 3/185; H01R 25/14; H01R 25/142; H01R 25/145; H01R 25/147; H01R 25/16; H01R 25/161; H01R 25/162; H01R 25/164; H01R 25/165; H01R 25/167; H01R 25/168
USPC ................................ 439/190–195, 198, 206
See application file for complete search history.

(56) References Cited

U.S. PATENT DOCUMENTS

| 6,504,098 | B2 | 1/2003 | Seamans |
| 6,717,049 | B1 | 4/2004 | Makwinski |
| 7,374,444 | B1 | 5/2008 | Bennett |
| 7,645,051 | B2 | 1/2010 | Schultz |
| 8,480,420 | B2 * | 7/2013 | Ziobro .................... F21S 6/003 439/214 |
| 2009/0242538 | A1 | 10/2009 | Porzio et al. |
| 2018/0109054 | A1 * | 4/2018 | Chin .................. H01R 13/6205 |

* cited by examiner

*Primary Examiner* — Ross N Gushi
(74) *Attorney, Agent, or Firm* — Global Intellectual Property Agency, LLC; Daniel Boudwin

(57) ABSTRACT

A wall mounted rail system for providing additional air flow and electrical outlets to a room. The system includes a first rail removably securable to a second rail, wherein each rail includes a front surface and a rear surface. The rear surface can secure to a wall and a decorative molding, such as chair rail molding, is secured to the front surface. A plurality of ports are disposed on a bottom face of the front surface and can supply power to a device connected to each port. Further, each port is electrically connected to one another. Tubing extends through an interior volume of each rail and plurality of apertures are disposed on a top face of the front surface thereof. Each aperture is in fluid communication with the tubing to allow air to flow from the tubing, through the apertures, and into the room.

19 Claims, 4 Drawing Sheets

WALL MOUNTED RAIL SYSTEM

CROSS REFERENCE TO RELATED APPLICATION

This application claims the benefit of U.S. Provisional Application No. 62/624,904 filed on Feb. 1, 2018. The above identified patent application is herein incorporated by reference in its entirety to provide continuity of disclosure.

BACKGROUND OF THE INVENTION

The present invention relates to wall moldings. More specifically, the present invention provides a wall mounted rail system that supplies additional air flow and electrical outlets throughout a room.

Electrical outlets, USB outlets, and HVAC vents are often located in inconvenient places within a home or office or there are too few within a room to accommodate the needs of a household or business. In some cases, an extension cord must be used in order to reach the outlet, leading to potential fire or tripping hazards. Further, a room appears sloppy with extension cords strewn thereabout. Outlets may be blocked by furniture, causing frustration for a user trying to locate or access the outlet. In addition, HVAC ducts may be blocked by furniture, causing an inefficient airflow within a room. Therefore, a decorative chair rail containing a plurality of electrical outlets and a plurality of apertures configured to provide airflow therethrough, wherein the chair rail can be conveniently placed within a home or office is needed.

In light of the devices disclosed in the known art, it is submitted that the present invention substantially diverges in design elements from the prior art and consequently it is clear that there is a need in the art for an improvement to existing wall mounted rail systems. In this regard the instant invention substantially fulfills these needs.

SUMMARY OF THE INVENTION

In view of the foregoing disadvantages inherent in the known types of wall mounted rail systems now present in the prior art, the present invention provides a new wall mounted rail system wherein the same can be utilized for providing convenience for the user when providing additional air flow and electrical outlets to a room.

It is therefore an object of the present invention to provide a new and improved wall mounted rail system that has all of the advantages of the prior art and none of the disadvantages. The wall mounted rail system comprises a first rail removably securable to a second rail, wherein each rail includes a front surface and a rear surface. In some embodiments, the first rail is securable to the second rail via a ball detent latching fastener. The rear surface is configured to secure to a wall. A front face of the front surface is configured to receive a decorative molding, such as chair rail molding. A plurality of ports are disposed on a bottom face of the front surface and are adapted to supply power to a device connected to each port. Each port is electrically connected to one another. A tube extends through a channel within an interior volume of each rail, wherein a plurality of apertures are disposed on a top face of the front surface. Each aperture is in fluid communication with the tubing in order to allow air to flow from the tubing, through the apertures, and into the room. A connector tube in the first rail is adapted to connect to an outlet of an HVAC system and supply air therefrom to the remainder of the tubing.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
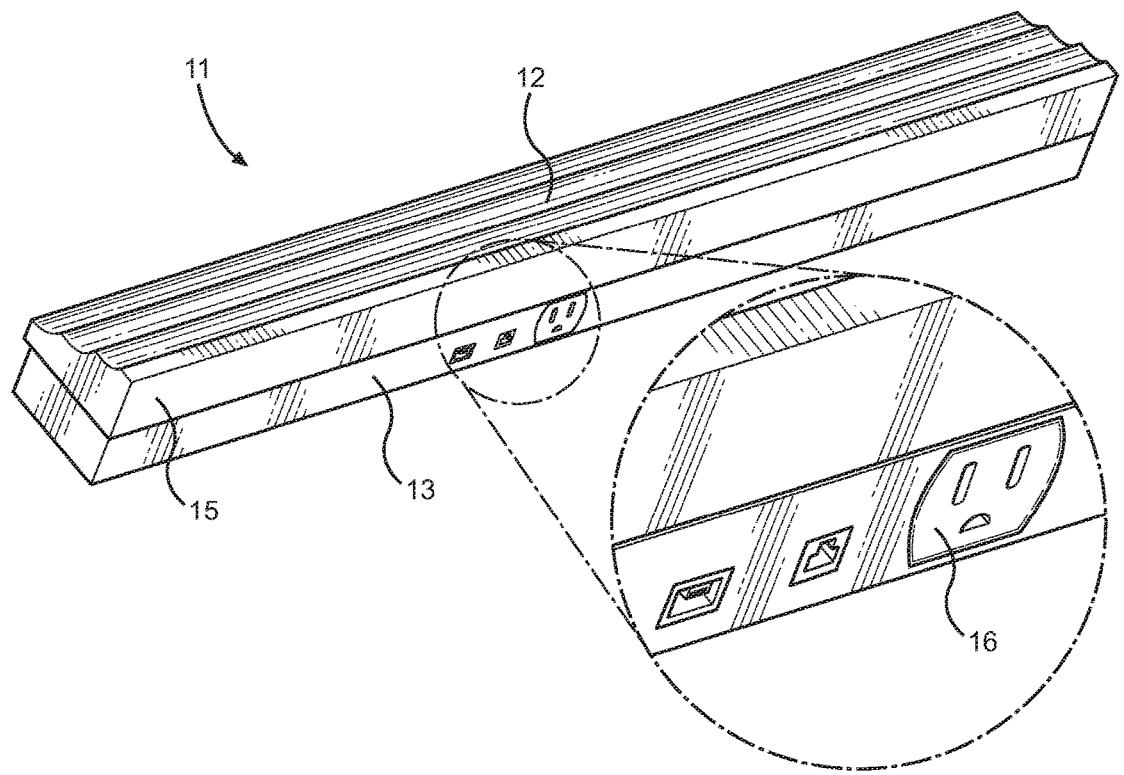
FIG. 1 shows a bottom perspective view of an embodiment of the wall mounted rail system.

Reference is made herein to the attached drawings. Like reference numerals are used throughout the drawings to depict like or similar elements of the wall mounted rail system. For the purposes of presenting a brief and clear description of the present invention, the preferred embodiment will be discussed as used for dispersing air flow and providing additional electric ports throughout the room. The figures are intended for representative purposes only and should not be considered to be limiting in any respect.

Figure 2:
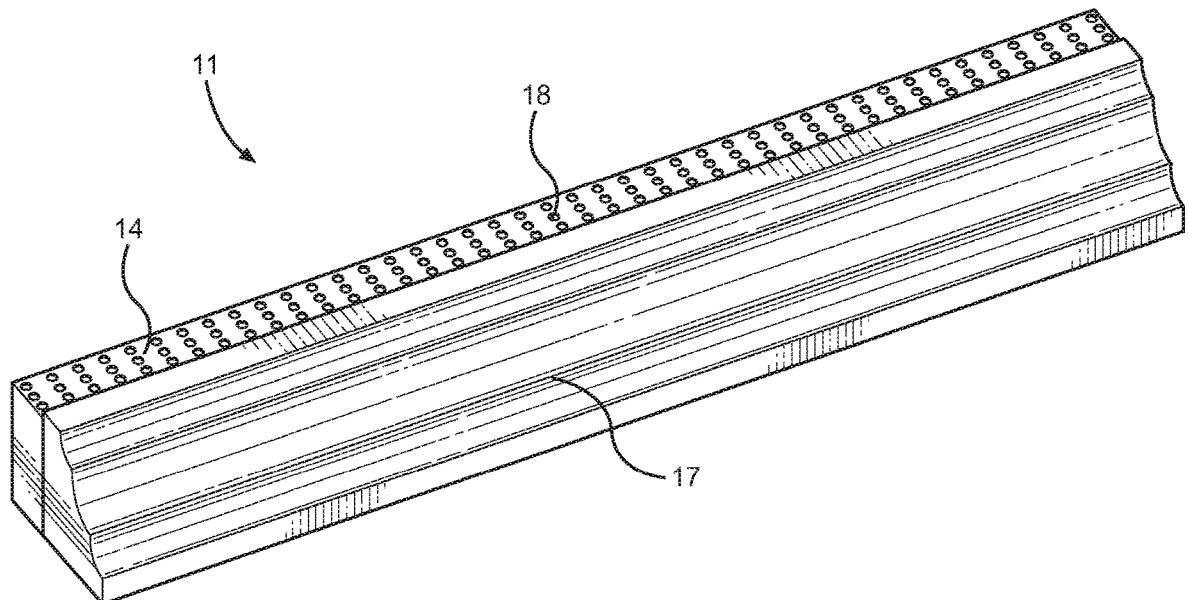
FIG. 2 shows a top perspective view of an embodiment of the wall mounted rail system.

Referring now to FIGS. 1 and 2, there is shown a bottom perspective view and a top perspective view of an embodiment of the wall mounted rail system, respectively. The wall mounted rail system 11 comprises a first rail 12 having a front surface and an opposing rear surface. The front surface comprises a bottom face 13, a top face 14, and a front face 15, wherein the bottom and top face 13, 14 are parallel to one another and each perpendicular to the front face 15. In the illustrated embodiment, the bottom face 13 comprises plurality of ports 16 disposed thereon and the top face 14 comprises a plurality of apertures 18 for allowing air to pass therethrough. The wall mounted rail system 11 is adapted to secure to a wall of a room and provide access to various electrical inputs and additional air flow to the room. In the illustrated embodiment, the first rail is rectangular in shape and the front face 15 comprises molding 17, such as chair molding, thereon. In this way, the wall mounted rail system 11 allows a user to replace conventional chair molding with the functional benefits provided herein, wherein the aesthetic appeal of the molding is retained.

In the illustrated embodiment, the ports 16 are disposed on the bottom face 13 of the front surface to conceal the appearance of the ports 16 to a user, but also provide convenient access thereto, when the rail 12 is secured along a central area of a wall. The central area of a wall is defined as between a ceiling and floor of the room or where a chair rail molding would conventionally be secured to the wall. The ports 16 are adapted to supply power to a device connected thereto. Each port 16 is operably and electrically connected to one another, such that if power is supplied to a single port, power is in turn supplied to all the other ports 16 of the rail 12. In the illustrated embodiment, the plurality of ports include a USB port, an ethernet port, and an electrical outlet. In the illustrated embodiment a single set of ports are disposed on the bottom face of the first rail 12. However, in alternate embodiments (as seen in FIG. 3), multiple sets of repeating ports are disposed along the front surface of the rail 12.

In the illustrated embodiment, the plurality of apertures 18 are disposed in a plurality of rows and columns extending from each edge of the top surface 14. The pattern of apertures 18 allows for air to flow through the apertures 18 at a consistent rate from an interior of the rail 12 into the room. In an alternate embodiment, the apertures are positioned in any suitable pattern in order to allow for a consistent rate of air flow therethrough, such as a staggered pattern. In the illustrated embodiment, each aperture 18 is directly exposed to a channel on the interior volume of the rail 12 (as seen in FIG. 3, 20). In alternate embodiments, each aperture is directly connected to a tube extending through the channel and operably connected to an exterior air supply.

Figure 3:
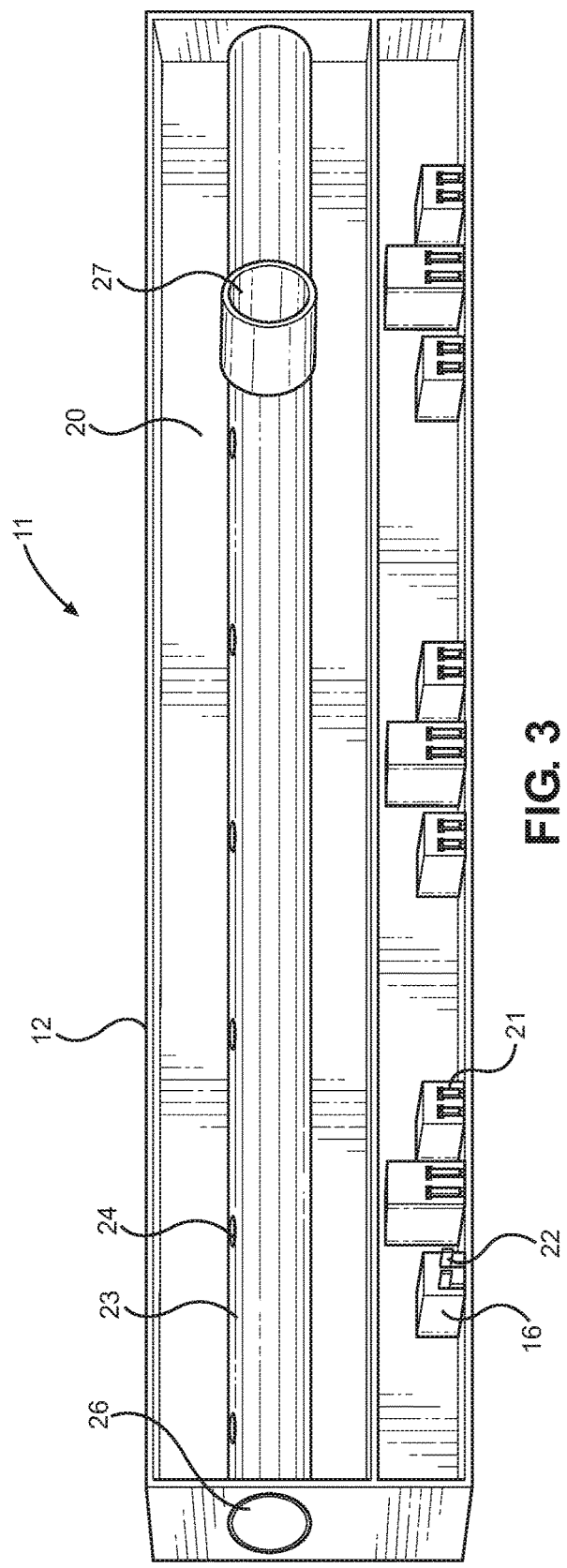
FIG. 3 shows a rear perspective view of a first rail of an embodiment of the wall mounted rail system.
Figure 4:
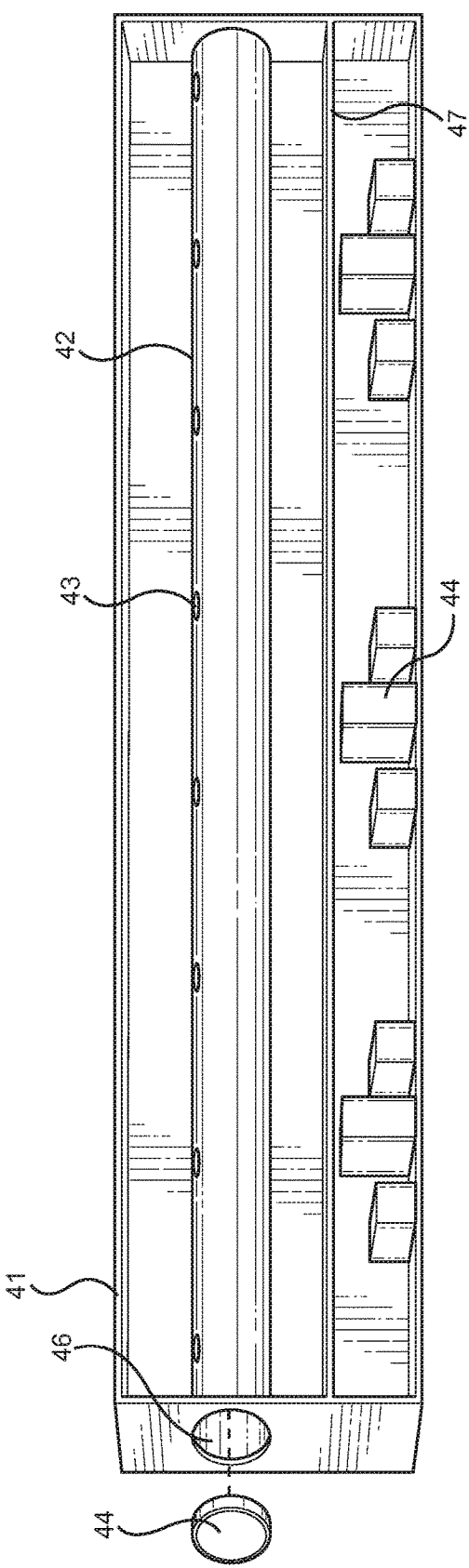
FIG. 4 shows a rear perspective view of a second rail of an embodiment of the wall mounted rail system.

Referring now to FIGS. 3 and 4, there is shown a rear perspective view of a first rail of an embodiment of the wall mounted rail system and a rear perspective view of a second rail of an embodiment of the wall mounted rail system, respectively. In the illustrated embodiment, each port of the first rail 12 comprises a male connection 22 configured to engage with a wall outlet. In this way, the first rail 12 is configured to secure to the wall via a connection of a single port 16 to an outlet disposed in the wall. In alternate embodiments, the rear surface comprises an adhesive configured to adhere and form a seal between the rear surface and the wall. In other embodiments, a bracket extends from the wall configured to contact the rail, such that a fastener, for example a screw, can be disposed through both the rail and bracket. In some embodiments, an entire perimeter of the rear surface comprises a seal configured to contact the wall to prevent air flow therebetween. Each port 16 further includes a pair of recesses 21 configured to receive and store the male connection 22 when not in use. In the illustrated embodiment, the male connection 22 is pivotally secured to the port such that the male connections are selectively movable between an extended and collapsed position. In the collapsed position, the male connection 22 is received entirely within the pair of recesses 21 and in the extended position, the male connection is perpendicular thereto.

In some embodiments, the wall mounted system includes a second rail 41 removably securable to the first rail 12. In this way, the user can select the number of rails 12, 41 needed for a particularly sized room. The second rail 41 includes a second set of ports 44, wherein the second set of ports 44 are in electrical and operable connection with the plurality of ports 16 of the first rail 12. In the illustrated embodiment, the second rail 41 does not include male connections on each port since power is provided to the ports via connection to the first rail 12.

In the illustrated embodiment, a first tube 23 and a second tube 42 each extend through the channel 20 within the interior of the first and second rail 12, 41, respectively. The first and second tubes 23, 42 extend an entire length of the rail 12, 41 and comprises at least one hole 24, 43 on an upper side thereof. The upper side of each tube 23, 42 faces the plurality of apertures of the first and second rails 12, 41 such that air expelled from the first and second tubes 23, 42 through the hole 24 is directed to the plurality of apertures.

The first rail 12 further comprises a connector tube 27 extending perpendicularly from the first tube 23. The connector tube 27 is configured to align with and connect to an outlet tube of an HVAC system that is disposed within the wall. The ends 26, 46 of each the first tube 23, second tube 42, and connector tube 27 are open. Further, each embodiment includes a plug 44 configured to seal an end of the first or second tube 23, 42 to prevent air from flowing through the ends thereof. In the illustrated embodiment, the plug 44 is removable and comprises a substantially similar cross section as the tubes 23, 42, such that the plug 44 fits within the end of the tubes 23, 42 to create a seal therebetween. In the illustrated embodiment, a divider 47 is disposed between the first and second tubes of the first and second rails, respectively, such that two interior volumes are formed. The divider 47 creates a more compact environment for the tubes in order to enhance the efficiency of the air flow therein.

Figure 5A:
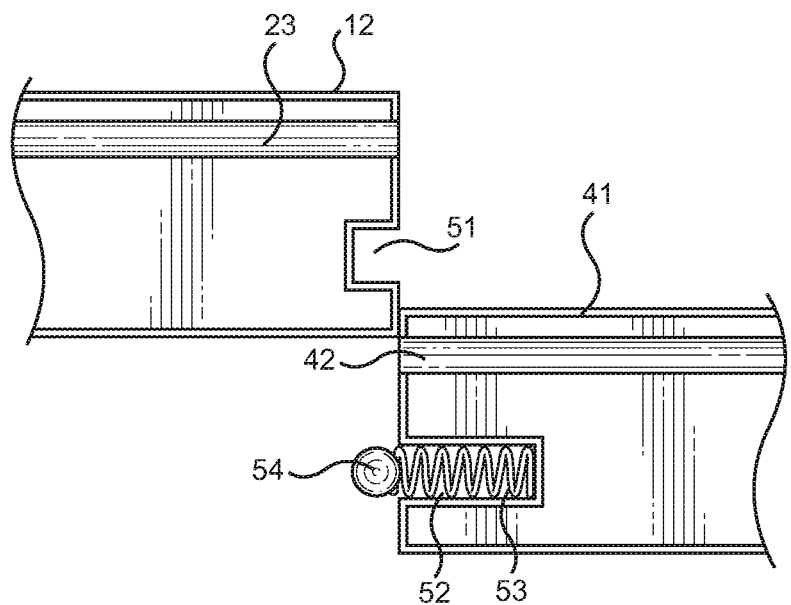
FIG. 5A shows a cross-sectional view of a first rail securing to a second rail of the wall mounted rail system.
Figure 5B:
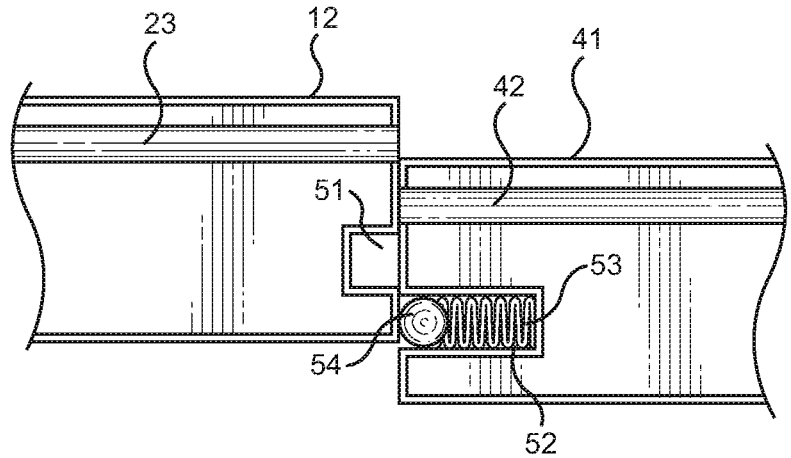
FIG. 5B shows another cross-sectional view of a first rail securing to a second rail of the wall mounted rail system.
Figure 5C:
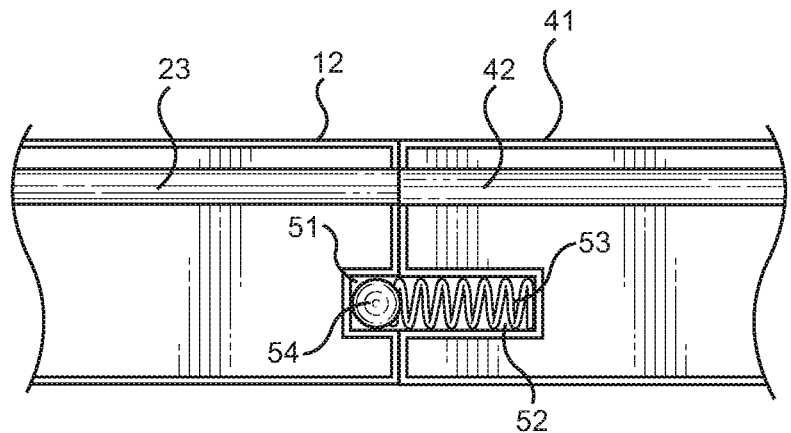
FIG. 5C shows a cross-sectional view of a first rail aligned with and secure to a second rail of the wall mounted rail system.

Referring now to FIGS. 5A-5C, there are shown cross-sectional views of a first rail securing to a second rail of the wall mounted rail system and a cross-sectional view of a first rail aligned with and secure to a second rail of the wall mounted rail system, respectively. The second tube 42 disposed within the second rail 41 extends entirely from a first end of the second rail 41 to a second end of the second rail 41 such that a first end of the first tube 23 is operably connected to a second end of the second tube 42 such that a seal is formed therebetween. In some embodiments, an additional piece of tubing extends from the first tube 23 and into the second tube 42 in order to form the seal. In other embodiments, a sealant is used to join the end of the first tube 23 to the end of the second tube 42. However, it is not meant to be limiting as to how the first tube 23 and the second tube 42 are sealed and connected to one another.

In some embodiments, the first rail 12 is securable to the second rail 41 via a ball detent latching fastener. In the illustrated embodiment, the ball detent latching fastener comprises a recess 51 disposed in the first rail 12 and a spring 53 and ball 54 disposed within a recess 52 of the second rail 41. A distal end of the spring 53 is affixed to the second rail 41, wherein the spring 53 is biased in an extended position such that the ball 54 is disposed exterior to the recess 52. In operation, when force is applied by the first rail 12 to the ball 54, thereby compressing the spring 53, the ball 54 moves within the recess 52 of the second rail 41. Once the first rail 12 is aligned with the second rail 41 the ball 54 extends within the recess 51 of the first rail 12 such that the first tube 23 and second tube 42 are aligned with one another. It is further contemplated in alternate embodiments that the ball 54 and spring 53 are disposed on the first rail 12. In the illustrated embodiment, the recesses 51, 52 are positioned on the lateral most ends of the first and second rails 12, 41.

Figure 6:
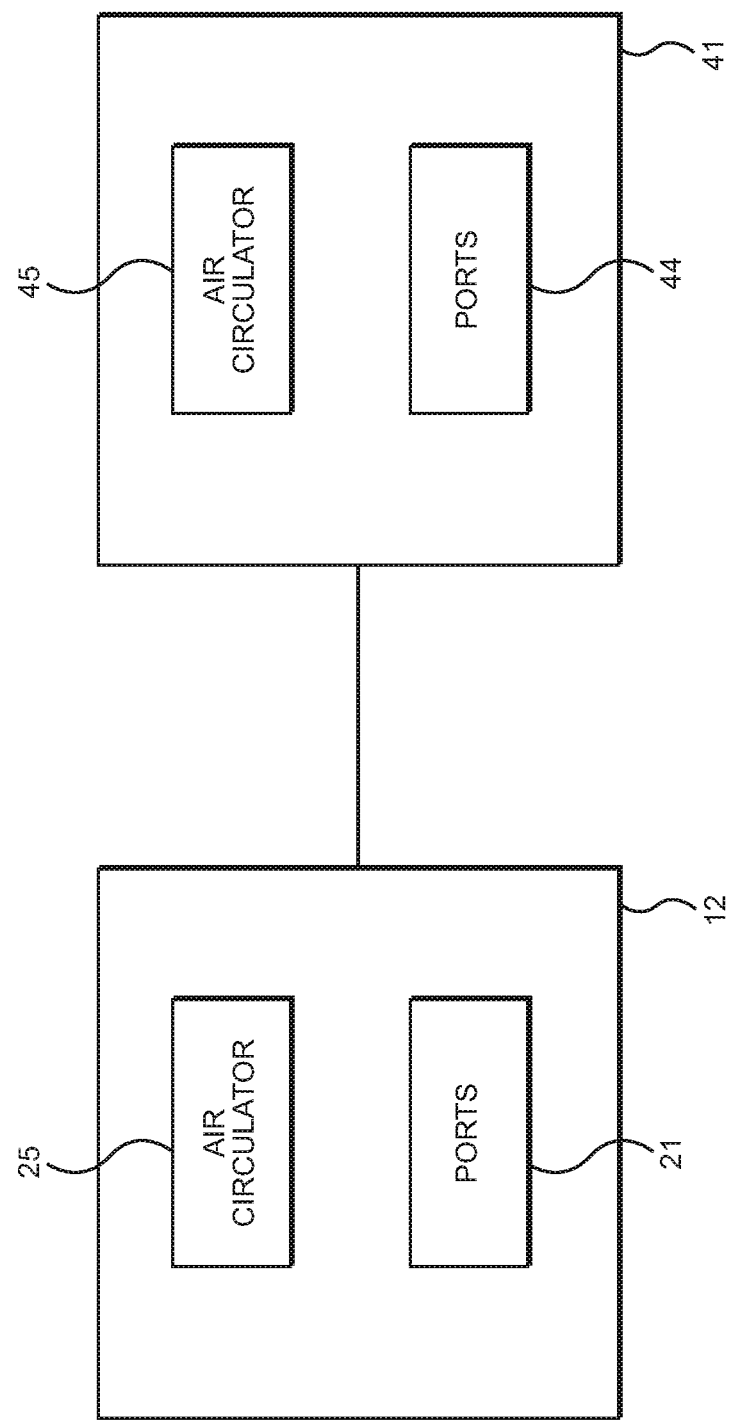
FIG. 6 shows a block diagram of a control circuit of a first rail connected to a second rail of the wall mounted rail system.

Referring now to FIG. 6, there is shown a block diagram of a control circuit of a first rail connected to a second rail of the wall mounted rail system. Each aperture is in fluid communication with the first tube 12 and the second tube 41 in order to allow air to flow from the tubes, through the apertures, and into the room. The connector tube in the first rail 12 is adapted to connect to an outlet of an HVAC system and supply air therefrom to the remainder of the first tube and the second tube. In some embodiments, an air circulator 25, 45 is disposed within the each of the rails and configured to move air flow from the first end to the second end of the rail. In this way, air is better circulated throughout the rail system and into the rooms. Further, the ports 16 of the first rail 12 are operably connected to the ports 44 of the second rail 41, such that a single port can be connected to a power source and supply power to the remainder of the ports 16, 44.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wall mounted rail system, comprising:
a first rail having a front surface and a rear surface, wherein the rear surface is configured to secure to wall;
wherein the first rail is configured to removably secure to a second rail;
wherein the first rail secures to the second rail along adjoining edges via a ball detent latching fastener;
a channel disposed within the first rail;
a plurality of ports disposed on the front surface configured to supply power to a device connected to each of the plurality of ports, wherein each port is electrically connected to one another;
a plurality of apertures disposed on the front surface, wherein each aperture is in fluid communication with an opening disposed on the rear surface of the first rail.

2. The wall mounted rail system of claim 1, wherein the plurality of ports include a USB port and an electrical outlet.

3. The wall mounted rail system of claim 1, wherein the front surface of the first rail comprises a top face, a bottom face, and a front face, wherein the plurality of ports are disposed on the bottom face and the plurality of apertures are disposed on the top face.

4. The wall mounted rail system of claim 3, wherein a decorative molding is secured to the front face.

5. The wall mounted rail system of claim 1, further comprising a first tube disposed through the channel, wherein the first tube extends entirely from a first end of the first rail to a second end of the first rail.

6. The wall mounted rail system of claim 5, wherein the first tube comprises at least one hole on an upper side thereof, wherein the upper side faces the plurality of apertures of the first rail such that air expelled from the first tube through the hold is directed to the plurality of apertures.

7. The wall mounted rail system of claim 6, further comprising a connector tube extending perpendicularly from the first tube, wherein the connector tube is configured to connect to an outlet of an HVAC system.

8. The wall mounted rail system of claim 5, further comprising a plug configured to seal an end of the first tube.

9. The wall mounted rail system of claim 5, further comprising an air circulator disposed within the first rail and configured to move air flow from the first end to the second end of the rail.

10. The wall mounted rail system of claim 5, further comprising a second tube disposed within the second rail, wherein the second tube extends entirely from a first end of the second rail to a second end of the second rail such that a first end of the first tube is operably connected to a second end of the second tube such that a seal is formed therebetween.

11. The wall mounted rail system of claim 1, wherein each port of the plurality of ports comprise a male connection configured to plug in to an electrical socket and supply electricity to all other connected ports.

12. The wall mounted rail system of claim 11, wherein the male connection is pivotally secured to the port such that the male connection is selectively movable between an extended position and a collapsed position, wherein the collapsed position, the male connection is received entirely within a pair of recesses and in the extended position, the male connection is perpendicular to the pair of recesses.

13. The wall mounted rail system of claim 1, further comprising a second set of ports in the second rail, wherein the second set of ports are in electrical and operable connection with the plurality of ports of the first rail.

14. The wall mounted rail system of claim 1, wherein a configuration of the plurality of apertures comprises a plurality of rows and a plurality of columns.

15. The wall mounted rail system of claim 1, wherein an entire perimeter of the rear surface comprises a seal configured to contact the wall to prevent air flow therebetween.

16. A wall mounted rail system, comprising:
a first rail having a front surface and a rear surface, wherein the rear surface is configured to secure to wall;
a channel disposed within the first rail;
a first tube disposed through the channel, wherein the first tube extends entirely from a first end of the first rail to a second end of the first rail;
a plurality of ports disposed on the front surface configured to supply power to a device connected to each of the plurality of ports, wherein each port is electrically connected to one another;
a plurality of apertures disposed on the front surface, wherein each aperture is in fluid communication with an opening disposed on the rear surface of the first rail.

17. A wall mounted rail system, comprising:
a first rail having a front surface and a rear surface, wherein the rear surface is configured to secure to wall;
wherein an entire perimeter of the rear surface comprises a seal configured to contact the wall to prevent air flow therebetween;
a channel disposed within the first rail;
a plurality of ports disposed on the front surface configured to supply power to a device connected to each of the plurality of ports, wherein each port is electrically connected to one another;
a plurality of apertures disposed on the front surface, wherein each aperture is in fluid communication with an opening disposed on the rear surface of the first rail.

18. A wall mounted rail system, comprising:
a first rail having a front surface and a rear surface, wherein the rear surface is configured to secure to wall;
a channel disposed within the first rail;

a plurality of ports disposed on the front surface configured to supply power to a device connected to each of the plurality of ports, wherein each port is electrically connected to one another;

wherein each port of the plurality of ports comprise a male connection configured to plug in to an electrical socket and supply electricity to all other connected ports;

a plurality of apertures disposed on the front surface, wherein each aperture is in fluid communication with an opening disposed on the rear surface of the first rail.

19. A wall mounted rail system, comprising:

a first rail having a front surface and a rear surface, wherein the rear surface is configured to secure to wall;

a channel disposed within the first rail;

a plurality of ports disposed on the front surface configured to supply power to a device connected to each of the plurality of ports, wherein each port is electrically connected to one another;

a plurality of apertures disposed on the front surface, wherein each aperture is in fluid communication with an opening disposed on the rear surface of the first rail;

wherein a configuration of the plurality of apertures comprises a plurality of rows and a plurality of columns.

* * * * *